United States Patent [19]

Hauler et al.

[11] 4,408,589

[45] Oct. 11, 1983

[54] PROCESS AND APPARATUS FOR OPERATING AN INTERNAL COMBUSTION ENGINE

[75] Inventors: Peter Hauler, Karlsruhe; Frieder Heintz, Blankenloch; Erich Zabler, Karlsruhe, all of Fed. Rep. of Germany

[73] Assignee: Robert Bosch GmbH, Stuttgart, Fed. Rep. of Germany

[21] Appl. No.: 815,868

[22] Filed: Jul. 14, 1977

Related U.S. Application Data

[63] Continuation of Ser. No. 590,704, Jun. 26, 1975, abandoned.

[30] Foreign Application Priority Data

Aug. 31, 1974 [DE] Fed. Rep. of Germany ....... 2441826

[51] Int. Cl.³ .............................................. F02B 3/00
[52] U.S. Cl. ................................. 123/494; 73/861.25
[58] Field of Search ............... 73/194 A; 123/32 EA, 123/32 EC

[56] References Cited

U.S. PATENT DOCUMENTS

| | | | |
|---|---|---|---|
| 2,826,912 | 3/1958 | Krity | 73/194 A |
| 2,993,373 | 7/1961 | Krity | 73/194 A |
| 3,818,877 | 6/1974 | Barrera | 123/32 EA |

*Primary Examiner*—Ronald B. Cox
*Attorney, Agent, or Firm*—Edwin E. Greigg

[57] ABSTRACT

An ultrasonic transmitter is disposed on one wall inside the air induction tube of an internal combustion engine and an ultrasonic receiver is disposed on the opposite wall, downstream of the transmitter. A second transmitter-receiver pair is similarly located, but with the positions of transmitter and receiver reversed. Thus, the signals from one transmitter travel generally with the air flow, whereas the signals from the second transmitter travel generally against the air flow. Since the travel time of the signals depends on the velocity of the flowing air, the frequencies of signals from the two receivers are different and this difference is used to determine the air velocity and, hence, the air flow rate.

4 Claims, 5 Drawing Figures

PROCESS AND APPARATUS FOR OPERATING AN INTERNAL COMBUSTION ENGINE

This is a continuation of application Ser. No. 590,704, filed June 26, 1975, now abandoned.

BACKGROUND OF THE INVENTION

The invention relates to a process and an apparatus for operating an internal combustion engine which preferably includes an electronic fuel injection system and an air-flow measuring device. The fuel is metered out to the air in the induction tube in dependence on operational parameters of the internal combustion engine. The invention further relates to an apparatus for carrying out the process according to the invention.

In order to achieve optimum combustion of fuel in an internal combustion engine, a particular fuel quantity must be metered out to the aspirated air. The determination of the proper mixture ratio is based on consideration of engine parameters such as the engine temperature and the engine rpm. In known installations, these parameters are fed to an electronic injection controller which forms an output signal that controls the individual fuel injection valves. In that apparatus, the measurement of the aspirated air quantity presents a particular problem. Known air flow rate meters used for measuring the aspirated air quantity in the motor vehicle are usually embodied on the principle of baffle plates. A plate is movably disposed perpendicular to the direction of the air flow and is deflected by the air against the force of a spring, the air induction channel being conically enlarged in the general region of the baffle plate. The particular disadvantage of this apparatus is that the moving mechanical parts are subject to wear and the baffle plate offers high resistance to the air flow, thus decreasing the aspirated air quantity. It is also known to provide air flow rate meters for an internal combustion engine which generate ions at some location within the air induction channel. These ions continue to move with the aspirated air stream and are subsequently deviated from the air stream by magnetic or electric fields. The disadvantage of this known system is that the generation and deviation of the ions requires high electric potentials which increases the cost of the system as does the required electrical insulation of certain parts of the induction channel. Furthermore, it is difficult to provide shielding against electrical disturbances produced by the system and the sensitivity of the mechanism to dirt and moisture is quite high.

OBJECT AND SUMMARY OF THE INVENTION

It is a principal object of the invention to provide a simple and inexpensive process for measuring the aspirated air quantity in an internal combustion engine.

It is a further object of the process according to the invention to measure the aspirated air without offering resistance to the air flow.

It is yet another object of the invention to provide a process for measuring the aspirated air which is insensitive to humidity and dirt.

These and other objects are achieved, according to the invention, in that the aspirated air flow rate is determined by comparing the traversal times of ultrasonic signals within the induction channel of the engine.

It is a still further object of the invention to provide an apparatus for carrying out the process described by the invention. This object is achieved by providing at least one ultrasonic transmitter and one ultrasonic receiver at diagonally opposite locations within the induction channel of the engine.

In a particularly advantageous embodiment of the invention, two ultrasonic transmitters and two ultrasonic receivers are provided and so located that the transmission path of one of the transmitter-receiver pairs is inclined obliquely to and in the direction of flow of the aspirated air whereas the transmission path of the other transmitter-received pair is inclined obliquely to and opposite to the direction of air flow. Yet another advantageous embodiment of the invention provides an oscillator coupled to both transmitters and a phase comparator coupled to both receivers.

These and other objects and advantages will become more apparent from the ensuing detailed specification of three exemplary embodiments of the invention taken in conjunction with the drawing.

DESCRIPTION OF THE PREFERRED EMBODIMENTS

Figure 1:
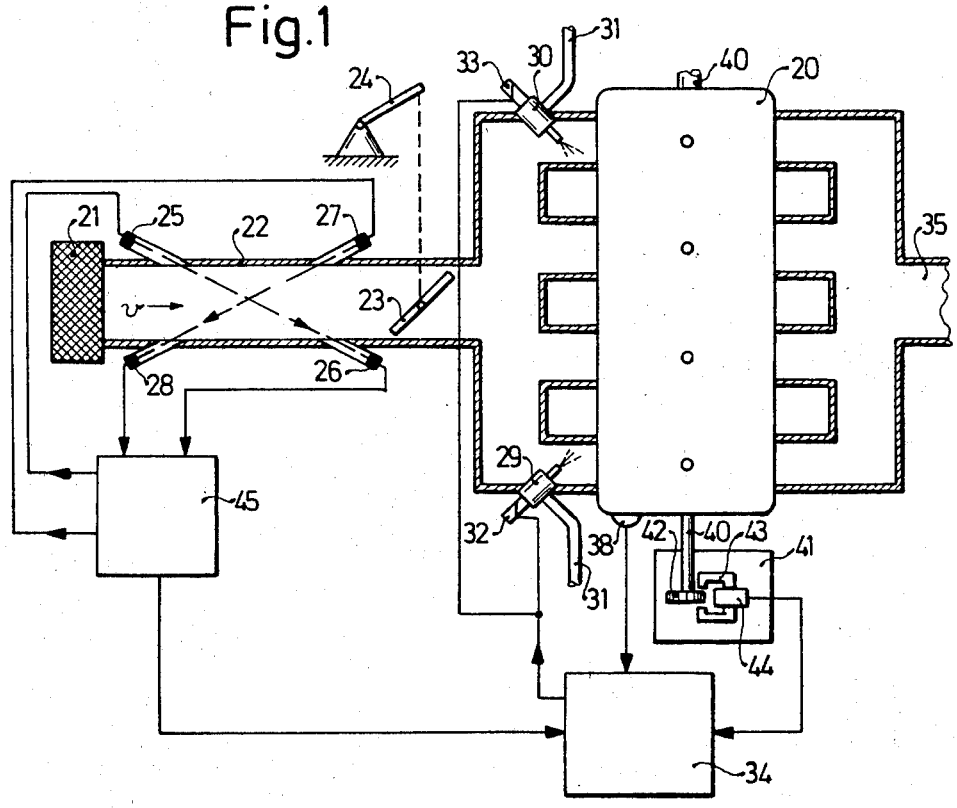
FIG. 1 is a partially schematic diagram of an internal combustion engine including a diagram of a first exemplary embodiment of an ultrasonic air flow rate meter according to the invention.

Turning now to FIG. 1, there is seen an internal combustion engine 20, shown only schematically, which aspirates combustion air through an air filter 21 and an induction tube 22. Located within the induction tube 22 is a throttle valve 23 which may be actuated by a gas pedal 24.

The air flow within the induction tube 22 is designated by the letter v and mounted on one wall of the induction tube 22 is an ultrasonic transmitter 25 which transmits ultrasonic signals to an ultrasonic receiver 26, disposed on the opposite wall, at some distance downstream of the transmitter. The direction of the ultrasonic signals makes an angle $\alpha$ with the direction of flow of the air. A second ultrasonic transmitter 27 transmits ultrasonic signals to a second ultrasonic receiver 28, located obliquely opposite the transmitter 27. The direction of signals from the second ultrasonic transmitter 27 also makes an angle $\alpha$ with respect to the direction of air flow, but, in this case, the ultrasonic signals travel generally opposite to the direction of air flow. The directions of travel of the two ultrasonic signals therefore intersect in the center of the induction tube 22. The transmitters 25, 27 as well as the receivers 26, 28 are positioned in recesses in the wall of the induction tube 22. The transmitters and receivers 25–28 may be commercially available ultrasonic air transducers, for example those made by the firm Valvo, type 8222 293 18281. These transducers have a resonant frequency of 39 kHz and operate on the principle of the piezo-electric effect.

Individual fuel injection valves 29, 30 inject fuel into branches of the induction tube 22, immediately ahead of the inlet valves which are not shown. The engine 20 shown in FIG. 1 is a four-cylinder engine but, for reasons of clarity, only two of its injection valves 29, 30 have been shown, although each of the other two cylinders also has an injection valve associated with it. Fuel is supplied to the injection valves 29, 30, etc. through a fuel line 31 and the valves are actuated electromagnetically by magnetic coils 32, 33. The two magnetic coils 32, 33 are connected to the output of an electronic fuel injection controller 34. The outlet valves (not shown) of the internal combustion engine 20 have individual exhaust lines which are combined in a common exhaust pipe 35. A temperature sensor 38 is placed in thermal contact with the engine block of the internal combustion engine 20. One input of the electronic fuel injection controller 34 is connected to the electrical output of the temperature sensor 38.

The crankshaft 40 of the engine 20 drives a pulse-generating tachometer 41. This tachometer includes a gear 42, rotated synchronously at crankshaft rpm. The gear 42 has ferromagnetic serrations which pass between the arms of a ferromagnetic yoke 43 when the gear 42 rotates. The yoke 43 carries a coil 44, and, when the gear 42 rotates, the magnetic reluctance of the magnetic circuit formed by the yoke 43 and the gear 42 changes periodically. This induces alternating currents in the coil 44, at a frequency proportional to the speed of rotation of the crankshaft 40, so that the tachometer 41 delivers a train of alternating voltage pulses, which are transmitted to a further input contact of the electronic fuel injection controller 34.

The ultrasonic transmitters and receivers 25–28 are connected to an electronic processor circuit 45 in a manner to be described below. This processor circuit 45 produces a signal which is proportional to the air flow rate in the induction tube 22 and which is transmitted to a third input contact of the electronic fuel injection controller 34.

The controller 34 accepts the information regarding the air flow rate, the engine rpm, the engine temperature and, possibly, signals from other transducers not shown in the drawing and forms an electrical output signal which is used to control the injection valves 29, 30 in known manner. This control process results in metering out a particular fuel quantity to a particular air quantity while taking account of all the relevant engine information so as to obtain optimum combustion within the internal combustion engine 20.

The air flow rate is measured in the following manner: the transmitter 27 transmits a signal which travels generally opposite to the direction of the air flow, to its corresponding receiver 28. The time of traversal is given by $t_1 = L/(c-v')$. The transmitter 25 transmits its signal in generally the same direction as the direction of air flow toward its receiver 26 and hence the traversal time is given by $t_2 = L/(c+v')$. In these equations, $v' = v \cos \alpha$, where v is the flow velocity of the aspirated air, c is the velocity of the propogation of sound in air and L is the length of the path traversed by the sound when going from a transmitter to a receiver. When these equations are inverted and subtracted from one another, the velocity of sound drops out and one obtains an expression for a signal which is proportional to the frequency, namely $$1/t_2 - 1/t_1 = f_2 - f_1 = 2v'/L$$

Hence the velocity of the aspirated air is $$v = L \Delta f/(2 \cos \alpha)$$

The air flow rate is proportional to v.

Figure 2:
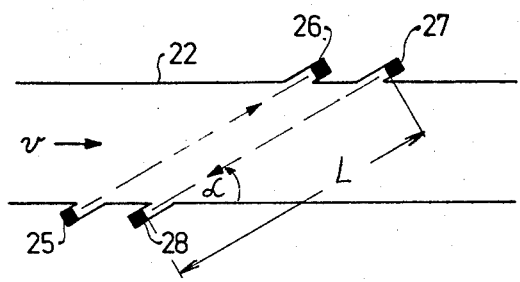
FIG. 2 depicts a second exemplary embodiment of an ultrasonic air flow rate meter according to the invention.

The second exemplary embodiment of the invention, shown in FIG. 2, depicts another possible location for the ultrasonic transmitters and receivers 25–28. In this instance, the paths of the sound are parallel so that the receiver 26 is adjacent to the transmitter 27 while the receiver 28 is adjacent to the transmitter 25. The electrical connection of the transmitters and receivers is the same as in FIG. 1.

Figure 3:
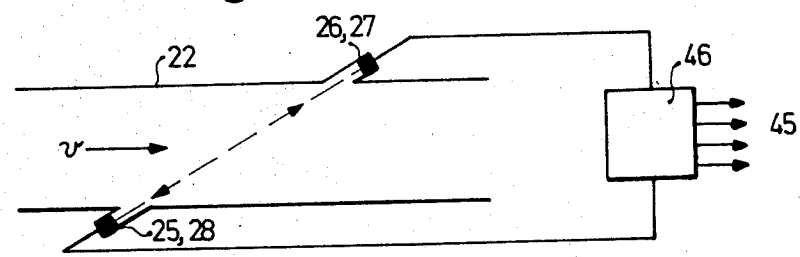
FIG. 3 depicts a third exemplary embodiment of an ultrasonic air flow rate meter according to the invention.

FIG. 3 depicts a third exemplary embodiment of the invention in which a single ultrasonic element takes the place of the receiver 26 and the transmitter 27 while another, single, ultrasonic element takes the place of the receiver 28 and the transmitter 25, as referred to in the exemplary embodiment of FIG. 2. The two single elements are connected to a known time multiplexer 46 which is connected, via the four lines already described above, to the electronic processor circuit 45. The time multiplexer 46 connects the ultrasonic elements 26, 27 or 25, 28 alternately so as to act as transmitter or receivers during predeterminable periods so that, at times, the ultrasonic signal travels generally opposite to the direction of air flow whereas, at other times, the ultrasonic signal travels generally in the direction of the aspirated air flow.

Figure 4:
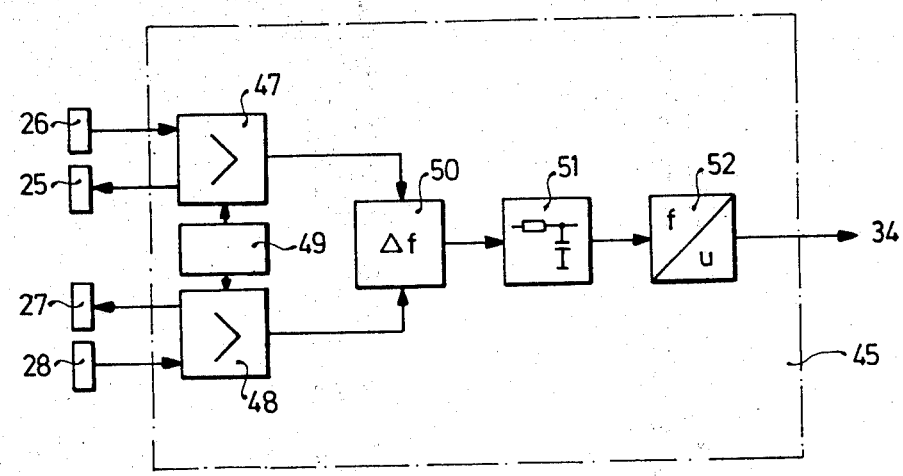
FIG. 4 is the electric block diagram of an electronic processor circuit for single ultrasonic signals.

FIG. 4 is an electric block diagram of an exemplary embodiment of a circuit for processing the ultrasonic signals to form a signal which is proportional to the air flow rate. Connected between each transmitter-receiver pair such as 25, 26 and 27, 28 is an amplifier 47 or 48, respectively. A starting pulse generator 49 is connected to both amplifiers 47, 48. Each of the two amplifiers 47, 48 is connected to a mixer stage 50 whose output is fed to a low pass filter 51 and thence to a frequency-to-voltage converter 52 and finally to the electronic fuel injection controller 34.

The function of the circuit shown in FIG. 4 is similar to a so-called sing-around process. A pulse received by one of the receivers 26, 28 is amplified in the appropriate amplifier 47 or 48, respectively, and is fed back to the associated transmitter 25, 27, respectively. The starting pulse generator 49 delivers a single starting pulse. Thus each of the closed loops 25, 26, 47 and 27, 28, 48 sustains a sequence of pulses whose frequency is equal to the inverse of the traversal times of the individual ultrasonic signals. The two frequencies generated in this manner, which obey the above-cited equations, are fed to the mixer stage 50 which forms their difference. Difference frequency generators of this type are known, for example from U.S. Pat. No. 3,644,721. The original high-frequency components are removed from the output signal of the mixer stage 50 by a low-pass filter 51 which passes only the much lower difference frequency. This difference frequency is fed to the frequency-to-voltage converter 52 which delivers an analog voltage which is fed to the electronic fuel injection controller 34. If the fuel injection controller 34 operates digitally, the frequency-to-voltage converter 52 may be omitted.

Figure 5:
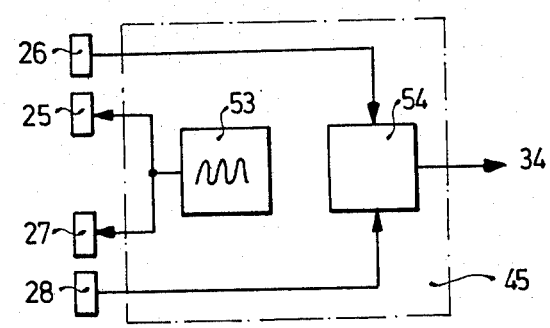
FIG. 5 is an electric block diagram of an electronic processor circuit for ultrasonic wave trains.

FIG. 5 is an electric block circuit diagram which may be used when it is desired to use continuous ultrasonic wave trains instead of discrete ultrasonic pulses. Such a system has the advantage of being less sensitive to disturbances and having higher acoustic power. In this case, an oscillator 53 is connected to both ultrasonic transmitters 25, 27 and operates at a frequency which is preferably equal to their resonant frequency. The signals received by the two receivers 26, 28 are at the same frequency but, because of the different travel times of the two wave trains (one being with the direction of air flow and the other being against the direction of air flow), the phases of the received wave trains are different. The incoming wave trains are fed to a phase comparator 54 which generates a signal that contains information regarding the magnitude of the phase difference of the two wave trains. This signal is fed to the electronic fuel injection controller 34. The larger the phase shift between the two wave trains, the larger is the aspirated air flow rate. Phase comparators which may be used in the apparatus according to this invention are known from descriptions of so-called phase locked loops, for example from the German Offenlegungsschrift No. 2,238,241.

The process for measuring the air flow rate by means of ultrasonic signals, as described by this invention, is especially suitable for use in motor vehicles because the apparatus used is insensitive to dirt. Any dirt particles which may be carried by the aspirated air do not adhere to the transmitter or the receiver because the air in their vicinity is agitated at the ultrasonic frequency. Thus, there is no soiling even over long periods of time and hence no deterioration in the functional efficiency of these parts. When the measuring path leads diagonally across the induction tube, as disclosed in this invention, the signal obtained corresponds to a well-averaged value of the air-velocity over the entire flow channel. The electric power required by the apparatus according to the invention is very low. When digitally operating fuel injection systems are used, it is an inherent advantage that the described apparatus produces a usable control frequency directly. Furthermore, it is not required to install special protective structures to prevent damage from a possible backfiring explosion.

Changes in the barometric pressure and in the temperature of the external air may produce changes in the air density. If these changes are large, for example due to a change of the geographical location of the internal combustion engine, then an air density detector may be provided and its signal may be used as a correction signal for the processor 45. This correction signal may be admitted, for example via a multiplying input.

What is claimed is:

1. In an apparatus for operating an internal combustion engine, said apparatus including an induction tube, an electronic fuel injection system and an air flow rate metering device, said system metering out a definite quantity of fuel into the induction tube to correspond to a definite quantity of air, the improvement in the apparatus comprising:
    (A) two ultrasonic transmitter means, associated with the induction tube and capable of generating ultrasonic signals and of transmitting these into the interior space of the induction tube;
    (B) two ultrasonic receiver means associated with the induction tube located opposite to respective ones of the ultrasonic transmitter means and such that a line connecting each of the transmitter means with its oppositely disposed receiver means is oblique to the longitudinal axis of the induction tube, each said receiver means being capable of receiving the ultrasonic signals transmitted by its oppositely disposed ultrasonic transmitter means after passage of the signals through at least a portion of the interior of said induction tube; and
    (C) means for measuring the travel time of the ultrasonic signals between said transmitter means and said receiver means, said measuring means including:
        (i) oscillator means, connected to each ultrasonic transmitter means, with the operating frequency of said oscillator means being such that each of said transmitter means produces thereby a continuous resonant ultrasonic output signal; and
        (ii) phase comparator means, connected to the ultrasonic receiver means for receiving and continuously comparing the phase difference between the continuous resonant ultrasonic output signals, and generating an output signal which is a measure of the compared phase difference.

2. In a process for operating an internal combustion engine, said engine including an electronic fuel injection system and an air flow rate metering device, said system metering out a definite quantity of fuel into the induction tube to correspond to a definite quantity of air, the improvement comprising the step of:
    (A) continuously transmitting a first resonant ultrasonic signal across the induction tube;
    (B) continuously transmitting a second resonant ultrasonic signal across the induction tube; and
    (C) continuously comparing the phase difference between the first and second resonant ultrasonic signals, which phase difference is a measure of the difference in time required for the first and second resonant ultrasonic signals to cross the induction tube, said time difference being a measure of air flow rate.

3. An apparatus as defined by claim 1, wherein the ultrasonic transmitter means and the ultrasonic receiver means are so associated with the induction tube that the signals traveling between one transmitter and its cooperating receiver have a velocity component in the direction of the air flow through the induction tube whereas the signals traveling between the second transmitter and its cooperating receiver have a velocity component in the direction opposite to the air flow through the induction tube.

4. An apparatus as defined in claim 1, wherein the ultrasonic transmitter means and the ultrasonic receiver means are so disposed that the path of the signals between one transmitter and its cooperating receiver crosses the path of the signals between the second transmitter and its associated receiver.

\* \* \* \* \*